May 24, 1938. R. W. WEEKS 2,118,124
ELECTRIC POWER PLANT
Filed Oct. 30, 1936 2 Sheets-Sheet 1
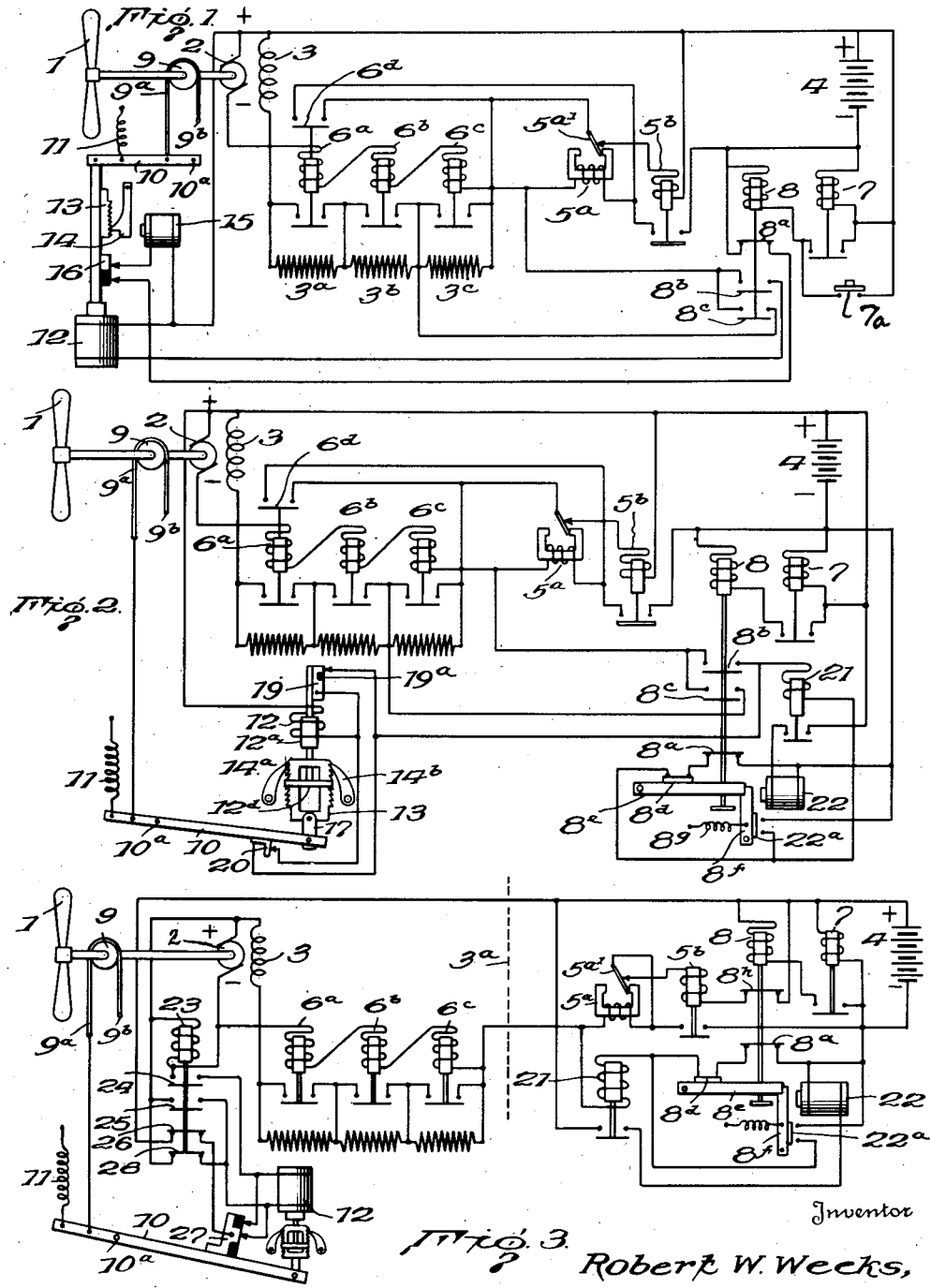
Inventor
Robert W. Weeks,
By Ralph B. Stewart
Attorney

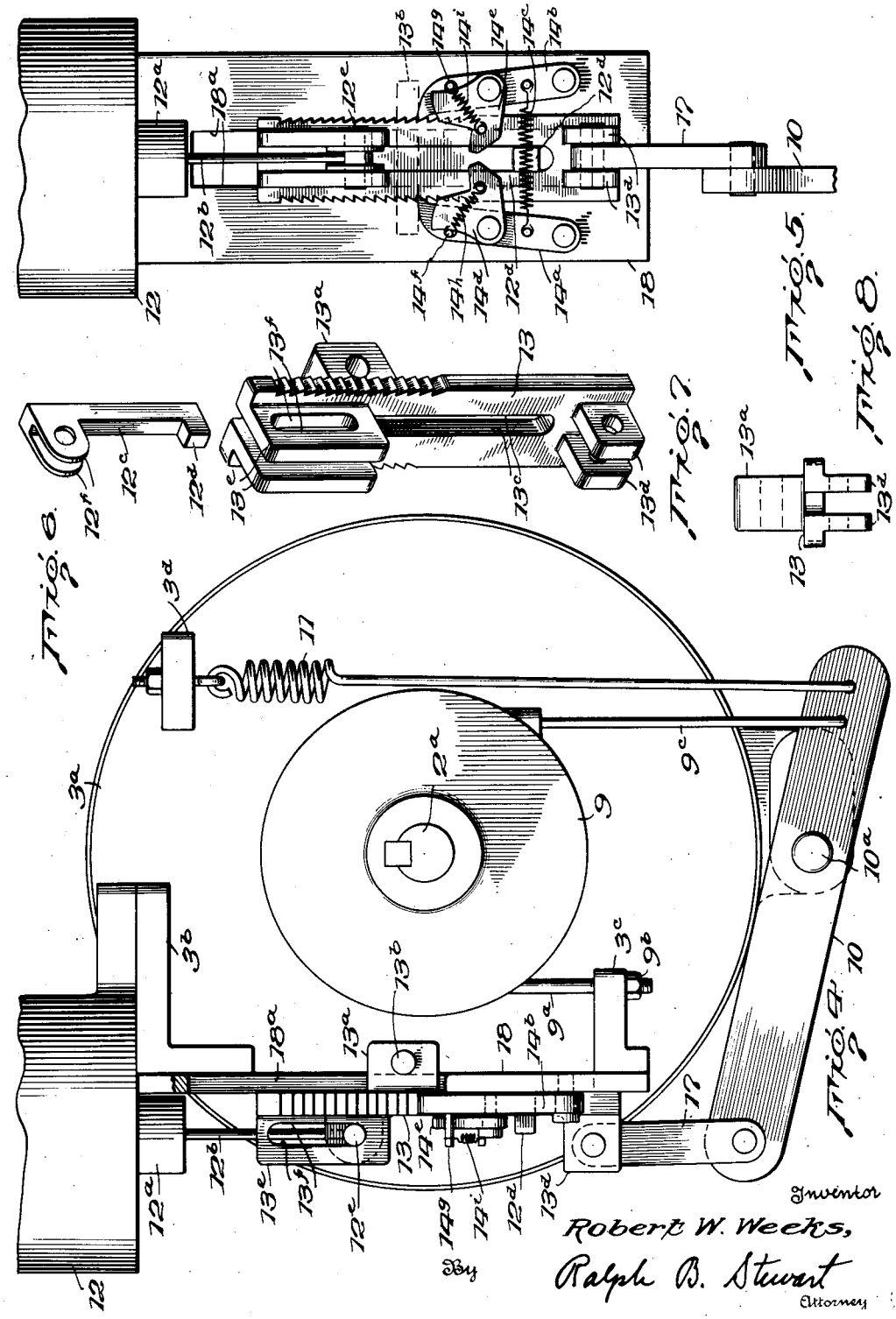

Patented May 24, 1938

2,118,124

UNITED STATES PATENT OFFICE 2,118,124

ELECTRIC POWER PLANT

Robert W. Weeks, West Chester, Pa., assignor to Edward M. Weeks, Washington, D. C.

Application October 30, 1936, Serial No. 108,464

15 Claims. (Cl. 290—44)

The present invention relates to electric power plants and in particular to wind driven power plants for the generation and storage of electric energy.

An object of the invention is to devise apparatus for the automatic control of the generator in accordance with the condition of charge of the storage battery connected thereto.

A more specific object of the invention is to devise control apparatus for automatically disconnecting the generator from the storage battery and applying a mechanical brake to stop the turbine and generator when the voltage of the battery exceeds a given value.

Another object of the invention is to devise control apparatus for tripping or releasing the mechanical brake and starting the generator when the voltage of the battery drops below a given value.

Still another object is to devise an electrically operated mechanical brake in which a single magnet is employed to set the brake as well as to release the brake.

A further object is to devise control apparatus for setting and releasing the mechanical brake by current transmitted over the charging lines connecting the generator with the storage battery.

Certain features of my invention are illustrated in the accompanying drawings in which:

Figure 1 is a circuit diagram showing one arrangement of a wind driven electric generating system according to my invention;

Figures 2 and 3 are circuit diagrams illustrating additional forms of electric generating systems according to my invention;

Figures 4 to 8 inclusive illustrate the details of construction of the mechanical brake employed in the present invention.

Referring to Figure 1, the wind turbine is represented at 1 for driving the armature 2 of the generator having a field coil 3. The turbine 1 may be a single-blade type or a multi-blade turbine. Also, it may be of the fixed-blade type, but I prefer to use a turbine provided with an automatic regulating device for changing the angle of the blades to suit the operation to different wind velocities. The generator armature 2 is connected through a suitable circuit to storage battery 4 which is kept charged by the generator and which supplies current to a load circuit, not shown. The positive terminal of the generator armature is connected to the positive terminal of the battery. The negative terminal of armature 2 is connected to the negative terminal of battery 4 through the windings of three current relays 6a, 6b and 6c, through the winding of a polarized current relay 5a and through the contacts of voltage relay 5b. The energizing winding of relay 5b is connected across the battery charging lines through contact 5a' on relay 5a. A voltage responsive relay 7 is connected across the battery, and the contact of relay 7 controls the circuit of relay 8, also connected across the battery. The contacts on relays 6a, 6b and 6c are arranged to short-circuit field resistances 3a, 3b and 3c respectively when the relays are energized. The field circuit of the generator extends from the positive terminal of the armature 2 through the field coil 3, through resistances 3a, 3b and 3c, through windings of relays 6a, 6b and 6c back to the negative terminal of the armature. If desired, the field circuit may be connected directly to the negative terminal of the armature without passing through the windings of the current relays. Relay 6a is designed to operate in response to a low value of load current while relay 6b requires a higher value of current for its operation, and relay 6c requires a still higher current value for its operation. Relay 7 is set to close at a voltage slightly in excess of the normal voltage of the battery, for example, it may be set to close at 7.5 volts for a 6-volt battery. Relay 6a is provided with a contact 6d to short-circuit the winding of relay 5a when relay 6a operates.

Mounted on the turbine shaft is a brake drum 9 provided with a brake band 9a, one end of which is anchored at 9b and the other end is secured to a lever 10 which is pivoted at 10a. A biasing spring 11 secured to lever 10 normally maintains the brake lever in a position to release the brake. Electro-magnet 12 is arranged to set the brakes by a connection from its armature to the lever 10. A rack 13 carried by the brake operated mechanism cooperates with a pawl 14 to maintain the brake in set position independently of the magnet 12. A release magnet 15 is arranged to withdraw the pawl 14 from engagement with the rack 13 and thereby release the brake. The circuit for trip magnet 15 is controlled by the normally closed contact 8a on relay 8, and the circuit of magnet 15 includes a normally open contact 16 mounted on the brake operating mechanism. The circuit of brake operating magnet 12 is connected across the charging lines and is controlled by normally open contact 8b on relay 8. Normally open contact 8c on relay 8 is arranged to short-circuit a portion of the field resistance. In Figure 1, contact 8c short-circuits resistance 3c, but this contact may be arranged to short-circuit two field resistance units, or the entire field resistance, if desired. The hand switch 7a is arranged to energize relay 8 independently of relay 7.

Operation of Figure 1 is as follows:

The circuit shown in Figure 1 is for a condition of operation where the battery voltage has dropped below its normal value, relay 7 has opened its contacts, and the brake has just been released. Under this condition, turbine 1 is free to rotate, and as it gains speed, the generator will pick up in voltage, and, as soon as the generator voltage becomes greater than the battery voltage, relay 5b closes the charging circuit from the generator to the battery 4. So long as the charging current is below the value necessary to operate relay 6a, the circuit connections remain as shown. As the turbine speed increases and the charging current also increases, relays 6a, 6b and 6c will operate on increasingly larger values of charging current and will short-circuit increasing amounts of field resistance, thereby causing the generator to operate under conditions to derive maximum available power from the turbine, all as more fully explained in my co-pending application Serial No. 87,309, filed June 25, 1936.

When the battery 4 becomes fully charged, and the voltage across relay 7 reaches a given voltage in excess of the normal voltage of the battery, relay 7 operates to close the circuit of relay 8. Operation of relay 8 completes a circuit through brake magnet 12 across the generator supply lines through contact 8b, and the magnet operates to set the brake. Simultaneously with the setting of the brake, a portion of the field resistance is short-circuited by contact 8c of relay 8. The purpose of short-circuiting a part of the field resistance is to establish dynamic braking in the generator as the turbine slows down. At this time magnet 12 forms a load across the generator. When the generator comes to a complete stop, the magnet 12 is no longer energized, but the pawl 14 maintains the brake in set position, and under this condition, the contact 16 prepares the circuit for energizing release magnet 15.

The power plant will remain shut down until the voltage of the battery drops below a predetermined value less than the normal voltage at which time relay 7 drops out and deenergizes relay 8. As soon as relay 8 drops out, contact 8a completes a circuit for trip magnet 15 through the battery, and the magnet withdraws pawl 14 from engagement with rack 13, thereby releasing the brake and completing the cycle of operation.

A modified control arrangement is illustrated in the circuit diagram shown in Figure 2. This arrangement has many features in common with the arrangement shown in Figure 1, and corresponding parts are indicated by like reference numerals. In Figure 2 the arrangement for controlling the generator field current to secure maximum power output of the turbine, the connections for reverse current relays 5a and 5b, and the connections for energizing relays 7 and 8 are the same as in Figure 1. The brake operating mechanism and the control circuits therefor are different from the arrangement shown in Figure 1.

In Figure 2 a single magnet 12 is employed for both setting and releasing the brake. A special lost motion mechanical connection is inserted between the plunger 12a of magnet 12 and the brake lever 10. This arrangement consists of a rack member 13 secured to the brake lever 10 by a link 17 and having a lost motion connection with a rod 12d secured to the magnet plunger. Rack teeth are formed on opposite sides of member 13 and two pawls 14a and 14b cooperate with these racks to hold the brake in set position. The lower end plunger is provided with a finger which is arranged to engage and unlatch the pawls 14a and 14b associated with the racks on opposite sides of the member 13. The arrangement is such that a short upward pull on the plunger of magnet 12 first releases the pawls 14a and 14b, and further movement of the plunger carries the finger 12b beyond the pawls and pulls up the brake lever 10 to set the brakes. When the magnet 12 is de-energized, the arrangement is such that the plunger can return to its normal position without disturbing the pawls 14a and 14b. The arrangement as shown in Figure 2 is merely diagrammatic; the details of construction are clearly illustrated in Figures 4 to 8 inclusive.

The brake setting and tripping mechanism is shown in Figures 4 to 8 inclusive. Figure 4 is a side elevational view of the mechanism; Figure 5 is a front elevational view; Figure 6 is a perspective view of the tripping element; Figure 7 is a perspective view of the latching element 13 and Figure 8 is a top end view of the latching element 13. The whole arrangement is preferably supported from the generator housing or frame 3a. The brake drum 9 is mounted upon the armature shaft 2a, and the brake lever 10 is pivotally supported upon an extension of the generator housing at 10a. The brake operating magnet 12 is supported upon an extension 3b of the generator housing, and the brake band 9a is anchored to an extension 3c of the generator housing at 9b. The other end of the brake band is connected to one end of the lever 10 by a connection 9c, and the same end of the brake lever is connected by a spring 11 to a lug 3d formed on the generator housing, the spring 11 acting normally to release the brake band.

The brake latching mechanism is supported upon a plate 18 which in turn is supported between brackets 3b and 3c. The rack member 13 is supported upon the plate 18 and is held in position by a lug 13a formed on the back of the member 13 and arranged to extend through a vertical slot 18a formed in plate 18 and a pin 13b passes through the lug 13a and maintains the member 13 in engagement with the plate 18. The details of construction of the member 13 are clearly indicated in Figure 7. This member consists of a plate-like casting having a central vertical slot extending down near the lower end. Two spaced lugs 13d located on the front face of the lower end of the member 13 provide a pivotal support for the upper end of the link 17, the lower end of which is pivotally joined to the brake lever 10. Two spaced lugs 13e are located on the front face of the member 13 near the upper end thereof and on opposite sides of slot 13c. Lugs 13e are provided with aligned vertical slots 13f.

The magnet plunger 12a has a lost motion connection with the member 13 by means of a rod 12b connected at its lower end with a pin 12e arranged to slide vertically in slots 13f formed in lugs 13e. A tripping member 12c shown in Figure 6 is arranged to slide vertically within the slot 13c formed in member 13, and this member is arranged to be moved vertically in the slot by a connection between the pin 12e passing through holes formed in lugs 12f on the upper end of the member 12c. The member 12c is provided at its lower end with a projection or extension 12d which extends beyond the face of the member 13, as shown in Figure 4.

Two pawls 14a and 14b are pivoted to the plate 18 and engage the racks formed on opposite sides of member 13, as clearly shown in Figure 5. These pawls are maintained in engagement with the racks by a spring 14c connecting the two pawls. Pivotally mounted on the two pawls are two dogs 14d and 14e, and these dogs are maintained in contact with stop pins 14f and 14g by suitable springs 14h and 14i shown in Figure 5. The arrangement is such that the arms of the dogs 14d and 14e extend across the face of the member 13 and lie in the path of extension 12d carried by the lower end of the tripping member 12c. The arrangement is such that upon energization of the magnet 12, the plunger 12a raises the member 12c and the tripping extension 12d engages the dogs 14d and 14e, pushing them sidewise and releasing the pawls 14a and 14b from engagement with the racks. Continued movement of plunger carries the projection 12d beyond the dogs and the pawls are again free to engage the racks. It will be noted that the tripping member 12c is directly operated by the plunger 12a whereas the latching member 13 is not operated by the plunger until the pin 12e travels the distance of the slot 13f. An instantaneous energization of the magnet 12 will effect the release of the dogs and thereby release the brake, but a continued energization of the magnet will cause the projection 12d to move beyond the dogs and the brake will be set by movement of the member 13 upwardly. When the magnet is de-energized and the plunger drops back so the extension 12d strikes the dogs, the weight of the plunger is sufficient to cause the dogs 14d and 14e to rotate about their pivotal axes against the force of biasing springs 14h and 14i and the tripping member 12c returns to its lowermost position without interference with the pawls 14a and 14b.

In Figure 2, the circuit for operating the brake magnet 12 extends from the positive terminal of the armature 2 through magnet 12, through either contact 19 mounted on the magnet armature or through contact 20 mounted on the brake lever 10, through contact 8b on relay 8, and through the windings of current relays 6a, 6b and 6c back to the negative terminal of the armature. It will be seen that contacts 19 and 20 are arranged in parallel in the circuit of magnet 12. Contact 19 is provided with an insulating insert 19a for interrupting the circuit through magnet 12 after the magnet armature has traveled a distance sufficient for releasing the pawls 14a and 14b, but the contact 20 mounted on brake lever 10 is arranged to maintain the magnet circuit closed while contact 19 passes over the insulating insert as the brake lever is being moved from off position to set position. Contact 20, however, is arranged to open the circuit of magnet 12 when the brakes are set, but, at this time, the circuit of magnet 12 is completed through the lower part of contact 19 below the insert 19a.

The circuit for tripping the brake extends from the positive terminal of the armature (and of the battery 4) through the magnet 12 through contact 19 through the winding of a current relay 21, through contact 8d carried on an arm 8e having a lost motion connection with the plunger rod of relay 8, through contact 8a on relay 8 and back to the negative terminal of battery 4. The arm 8e is maintained in elevated position by a latch 8f, and a magnet 22 controlled by relay 21 is arranged to release the latch bar 8f. A contact 22a carried by latch bar 8f is arranged to complete the circuit of current relay 22 independently of contacts 8a and 8d so long as magnet 22 is energized, but as soon as magnet 22 is de-energized, biasing spring 8g breaks contact 22a.

The circuit as shown in Figure 2 represents a condition of operation where the voltage of the battery 4 is below its normal voltage and the battery needs recharging, and the mechanical brake has been released. The position of the arm 8e associated with relay 8, however, is not normal for the condition stated, since the arm 8e should be in tripped position with contact 8d open. The showing of arm 8d in Figure 2 is for the purpose of illustrating how the arm is held in latched position by the latch 8f.

Under the conditions described above for Figure 2, the turbine 1 is free to rotate, and as soon as the generator attains a speed sufficient to charge the battery 4, the relay 5b closes a charging circuit and the charging operation continues as described above in connection with Figure 1 until the battery becomes fully charged, at which time relay 7 operates to energize relay 8. The closing of contact 8b on relay 8 energizes the brake magnet 12 and applies the brake. Simultaneously, contact 8c short-circuits a portion of the field resistance to produce dynamic braking as explained previously. As the turbine slows down and finally comes to a stop, the generator 2 loses its voltage and magnet 12 becomes de-energized and its armature drops back to the position shown in Figure 2, but the brake remains in latched position. When the relay 8 is energized, the armature of this relay raises arm 8e into the latched position as shown in Figure 2, thereby closing contact 8d.

The turbine remains shut down until the voltage of the battery drops below a predetermined value, at which time relay 7 drops out and de-energizes relay 8. As the relay 8 drops out, contact 8a completes a circuit through the brake magnet 12 extending from the negative terminal of battery 4, through contact 8a, through contact 8d, through the winding of current relay 21, through contact 19 and back to the positive terminal of the generator and battery. Current flowing through this circuit energizes magnet 12 thereby raising the trip element to disengage the pawls 14a and 14b from the rack or latching element 13 and thus releases the brake. The insulating insert 19a on contact 19 prevents the plunger of magnet 12 from being moved beyond the position necessary to release the pawls 14a and 14b. The insulating segment 19a interrupts the circuit of magnet 12, and in this way the brake is released by a single impulse of current. The current flowing through the tripping circuit also energizes relay 21 which in turn energizes trip magnet 22 to release the arm 8e on relay 8. Contact 22a on latch arm 8f is arranged to bridge contacts 8a and 8d until the brake magnet has sufficient time to operate, but as soon as the brake magnet circuit is interrupted at the insulating segment 19a, magnet 21 is de-energized, which in turn effects de-energization of trip magnet 22, and contact 22a is immediately opened. It will be understood that by proper design of the circuits, the tripping of the arm 8d can be made to occur simultaneously with the breaking of the brake magnet circuit at the insulating insert 19a, and under this condition, the contact 22a will not be needed. When the brake is released, the elements return to the position shown in Fig. 2, except that the arm 8e will be in released position and the contact 8d will be open, thereby preventing closing of the brake magnet circuit until the relay 8 is again energized.

In Figure 3 I have shown the circuit diagram of an arrangement in which the brake magnet is controlled over the same pair of wires that connects the generator to the battery for charging the battery. By such an arrangement, all of the apparatus located to the left of the dotted line 3a can be located on top of the tower supporting the wind turbine, while the apparatus to the right of this line can be located in the battery house on the ground, and only two wires are necessary to connect the apparatus on the tower with the apparatus in the battery house. Various elements in Figure 3 corresponding to similar elements in Figures 1 and 2 are indicated by like reference numerals.

The connections of relays 7 and 8 in Figure 3 are the same as in Figures 1 and 2, but the circuit of relay 5b includes the contact 8h on relay 8, which contact is opened when relay 8 operates. Current relay 21 is connected around relay 5a and the contacts of relay 5b through a circuit which includes contacts 8a and 8d of relay 8, and a contact 22a carried by latch 8f is arranged in shunt to the contacts 8a and 8d when the trip magnet 22 is energized. The current relay 21 controls the circuit of trip magnet 22.

The circuits for energizing brake magnet 12 of Figure 3 are controlled by a relay 23, the winding of which is connected in shunt to the armature 2. When the relay 23 is in the position shown in the drawings, the magnet 12 is open-circuited, and the upper charging wire is connected to the positive terminal of the generator armature through a circuit including contact 26 of relay 23, contact 27 on brake arm 10 and contact 28 on relay 23. When the relay 23 is in the position shown in Figure 3, and the brake lever 10 is in the upper or "set" position, brake magnet 12 is connected in circuit in series with the armature 2 and battery 4 including contacts 26, contact 27 to the upper end of magnet 12, through the magnet and through contact 28 to the positive terminal of the armature. When the armature of relay 23 is in the upper position, brake magnet 12 will be connected across the armature 2 by contacts 24 and 25 of relay 23. Relay 23 is so designed that it requires a voltage in excess of the normal voltage of the armature 2 for its operation. Contact 27 carried by brake arm 10 is arranged to connect with the lower terminal of magnet 12 in the "released" position and connects with the upper terminal of magnet 12 in the "set" position.

The circuit condition shown in Figure 3 is for a condition of operation where the battery voltage is below normal and the battery needs recharging, but the arm 8e will be in tripped position for this condition of operation. The brake on the turbine has been released, and the turbine is free to rotate. As the generator speeds up and its voltage exceeds the voltage of the battery, relay 5b closes a charging circuit, and the charging operation continues as explained above in connection with Figure 1. So long as the battery is connected to the generator, the voltage developed across the armature 2 is not sufficient to operate relay 23 and the circuit conditions are as shown in the drawings.

When the battery becomes fully charged, relay 7 picks up and energizes relay 8 which in turn opens the circuit of relay 5b to disconnect the battery from the generator. The opening of the charging circuit unloads the generator which immediately speeds up and increases the voltage across the armature 2 to a value sufficient to operate relay 23. Operation of relay 23 connects brake magnet 12 across the armature 2 and sets the brake. As soon as the turbine slows down, magnet 23 drops back to the normal position shown in Figure 3, thereby connecting magnet 12 in series with the charging line connecting the armature of the armature 2 to the positive terminal of battery 4. Simultaneously with the opening of the charging circuit, relay 8 pulls up arm 8e and closes the contact 8d.

When the battery voltage drops below the voltage necessary to maintain relay 7 in operated position, relay 8 is de-energized and contact 8a completes a circuit from the negative terminal of battery 4 through contact 8a, through contact 8d, through series relay 21 and to the negative terminal of the armature 2 through the windings of current relays 6a, 6b and 6c. This completes a series circuit from the battery 4 to the generator including brake magnet 12 and series relay 21. Current flowing through this circuit from the battery 4 energizes brake magnet 12 sufficient to release the pawls and thereby release the brake. It will be understood that as soon as the pawls are released on the brake latch, the brake arm 10 releases and opens the circuit to magnet 12, thus limiting the current in the magnet 12 to a single "impulse" for releasing the brake. Current flowing through series relay 21 causes this relay to operate and energizes trip magnet 22 which in turn releases the arm 8e to open contact 8d. Contact 22a on latch arm 8f momentarily shunts contacts 8a and 8d until the circuit through magnet 12 is broken at contact 27, it being understood that the contact points associated with contact 27 are spaced apart so that as the arm moves from the "set" position to the "released" position, the connection to the upper contact point is broken before connection is made to the lower contact point, thereby interrupting the circuit momentarily. As explained above in connection with Figure 2, by proper design of the various elements, it is possible to trip arm 8e at the same instant that the circuit is interrupted at contact 27, and under this condition contact 22a will be unnecessary.

The mechanical brake may be adjusted to stop the turbine without any aid from dynamic braking, but if the brake is adjusted so that it does not grab too suddenly and dynamic braking is used to help stop the turbine, sudden shock to the system is avoided. If desired, the mechanical brake may be operated manually to stop the turbine by providing a cord or cable for operating the rod 12b. It is obvious that the braking arrangement of my invention is useful independently of the particular type of field control shown and described.

It will be obvious to those skilled in the art that many modifications may be made in the arrangements disclosed herein without departing from my invention. By proper design of the relay 8, this relay may be made to operate at a predetermined voltage and may be connected directly across the battery 4, in which case relay 7 may be dispensed with. I prefer, however, to employ two relays as explained above, relay 7 being a small sensitive relay for controlling the circuit of relay 8 which performs the actual switching operations. Also, by proper design of current relay 21 this relay may be arranged to trip the latch element 8f directly and magnet 22 may be omitted. It is also obvious that the usual reverse current relay may be substituted for the current relay 5a and the voltage relay 5b to disconnect the battery from the generator when the current flows from the battery to the generator.

What I claim is:

1. In combination, a fluid turbine, an electric generator driven by said turbine, a battery and circuit connections from said generator for charging said battery, a mechanical brake for said turbine, means responsive to an over-voltage condition of said battery for applying said mechanical brake, means for disconnecting said generator from said battery when the voltage thereof drops below the voltage of said battery and means responsive to under-voltage condition of said battery and operated by current transmitted from the battery over said charging connections for releasing said brake.

2. In combination, a fluid turbine, an electric generator driven by said turbine, a battery and circuit connections from said generator for charging said battery, a mechanical brake for said turbine, means responsive to an over-voltage condition of said battery for applying said mechanical brake, means for latching said brake in set position, means for disconnecting said generator from said battery when the voltage thereof drops below the voltage of said battery, means including a magnet for releasing said latching means, and means responsive to an under-voltage condition of said battery for energizing said magnet by current from said battery.

3. In combination, a fluid turbine, an electric generator driven by said turbine, a battery and circuit connections from said generator for charging said battery, a mechanical brake for said turbine, means responsive to an over-voltage condition of said battery for interrupting the charging circuit, means responsive to an over-voltage condition of said generator to set the brake, and means responsive to under-voltage condition of said battery to release said brake.

4. In combination, a fluid turbine, an electric generator driven by said turbine, a battery and circuit connections from said generator for charging said battery, a mechanical brake for said turbine, a magnet for operating said brake, and means responsive to an over-voltage condition of said battery for interrupting said charging connections and for energizing said brake magnet from said generator.

5. In combination, a fluid turbine, an electric generator driven by said turbine, a battery and circuit connections from said generator for charging said battery, a mechanical brake for said turbine, a magnet for operating said brake, means responsive to an over-voltage condition of said battery for connecting said brake magnet to said generator to apply said brake, means for holding said brake in set position independently of said magnet, means for disconnecting said generator from said battery when the voltage thereof drops below the voltage of said battery and means responsive to under-voltage condition of said battery for releasing said holding means.

6. In combination, a fluid turbine, an electric generator driven by said turbine, a battery and circuit connections from said generator for charging said battery, a mechanical brake for said turbine, electric means for operating said brake, and a relay responsive to an over-voltage condition of said battery for connecting said brake operating means to said generator and for increasing the field current of said generator to increase the dynamic braking effect thereof.

7. In combination, a fluid turbine, an electric generator driven by said turbine, a battery and circuit connections from said generator for charging said battery, a mechanical brake for said turbine, a magnet for operating said brake, means responsive to an over-voltage condition of said battery for energizing said brake magnet to apply said brake, means for holding said brake in set position independently of said magnet, and means for releasing said holding means by impulse excitation of said brake magnet.

8. In combination, a fluid turbine, an electric generator driven by said turbine, a battery and circuit connections from said generator for charging said battery, a mechanical brake for said turbine, a magnet for operating said brake, means responsive to an over-voltage condition of said battery for interrupting the charging circuit, means responsive to an over-voltage condition of said generator to connect said magnet to said generator and operate said brake, means for holding said brake in set position independently of said magnet, said relay being operative upon the stopping of said generator to connect said brake magnet in series in said charging circuit, means responsive to an under-voltage condition of said battery for completing said charging circuit whereby to transmit a current impulse over said charging circuit from said battery through said magnet coil, and means responsive to said current impulse for releasing said brake holding means.

9. In combination, a fluid turbine, an electric generator driven by said turbine, a mechanical brake for said turbine including a brake lever, a magnet for operating said lever, and a circuit for energizing said magnet from said generator, said circuit including a contact operated by said brake lever, and arranged to be open-circuited when said brake is in set position, and a second contact operated by the armature of said magnet and being connected in parallel with the first contact, said second contact being arranged to maintain the circuit of said magnet closed after the first contact opens.

10. In combination, a fluid turbine, an electric generator driven by said turbine, a battery and circuit connections from said generator for charging said battery, a mechanical brake for said turbine, means responsive to an over-voltage condition of said battery for applying said mechanical brake, means for latching said brake in set position, means including a magnet for releasing said latching means, means responsive to an under-voltage condition of said battery for energizing said magnet by current from said battery, and means responsive to current flowing to said magnet for opening the circuit from the battery to the magnet.

11. In combination, a fluid turbine, an electric generator driven by said turbine, a battery and circuit connections from said generator for charging said battery, a mechanical brake for said turbine, means responsive to an over-voltage condition of said battery for applying said mechanical brake, means for latching said brake in set position, means including a magnet for releasing said latching means, a circuit connecting said magnet to said battery including a normally open contact and a normally closed contact in serial circuit relation, means responsive to an over-voltage condition of said battery for opening said normally closed contact and for closing said normally open contact, means for latching said normally open contact in closed position independently of said operating means, said over-voltage responsive means being operable upon under-voltage condition of said battery to close said normally closed contact and to thereby energize said magnet, and means responsive to current flowing to said magnet for unlatching said normally open contact.

12. In combination, a mechanical brake including a brake lever, a magnet for operating said lever, a lost motion connection between the armature of said magnet and said brake lever, a latch for holding said brake lever in set position, a tripping member operated by the armature of said magnet and being arranged to release said latch in the first part of the movement of said lost motion connection, said latch being arranged to permit the return of said tripping member without tripping the brake, whereby continued energization of said magnet to produce full movement of its armature will set said brake, and limited energization of said magnet will trip said latch and release said brake.

13. In combination, a mechanical brake including a brake lever, a movable member for operating said lever, a lost motion connection between the movable member and said brake lever, a latch for holding said brake lever in set position, a tripping member operated by the movable member and being arranged to release said latch in the first part of the movement of said lost motion connection, said latch being arranged to permit the return of said tripping member without releasing the brake, whereby full movement of said movable member will set said brake, and limited movement thereof will release said brake.

14. In combination, a mechanical brake including a brake lever, a magnet having an armature for operating said lever, a lost motion connection between the armature of said magnet and said brake lever, a latch for holding said brake lever in set position, a tripping member operated by the armature of said magnet and being arranged to release said latch in the first part of the movement of said lost motion connection, said latch being arranged to permit the return of said tripping member without releasing the brake, whereby continued energization of said magnet to produce full movement of its armature will set said brake, and limited energization of said magnet will trip said latch and release said brake, a circuit for energizing said magnet including a sliding contact movable with the armature of said magnet, said sliding contact being provided with an insulating insert to limit the movement of the armature to a distance sufficient only to release said latch, and a second contact operated by said brake lever to maintain said circuit closed while the first contact passes over said insulating insert, said second contact being arranged to open when the brake is fully applied.

15. In combination, a fluid turbine, an electric generator driven by said turbine, a battery and circuit connections from said generator for charging said battery, a mechanical brake for said turbine including a brake lever, a magnet having an armature for operating said lever, a lost motion connection between the armature of said magnet and said brake lever, a latch for holding said brake lever in said position, a tripping member operated by the armature of said magnet and being arranged to release said latch in the first part of the movement of said lost motion connection, said latch being arranged to permit the return of said tripping member without releasing the brake, a circuit for energizing said magnet including a sliding contact movable with the armature of said magnet, said sliding contact being provided with an insulating insert to limit the movement of the armature to a distance sufficient only to release said latch, a second contact operated by said brake lever to maintain said circuit closed while the first contact passes over said insulating insert, said second contact being arranged to open when the brake is fully applied, means responsive to an over-voltage condition of said battery for connecting the magnet circuit to the generator to apply said brake, and means responsive to under-voltage condition of said battery to connect the magnet circuit to said battery to trip said latch, and means responsive to tripping current flowing in said tripping circuit for opening said tripping circuit.

ROBERT W. WEEKS.